(12) United States Patent
Wyse et al.

(10) Patent No.: US 6,324,909 B1
(45) Date of Patent: Dec. 4, 2001

(54) SIGNAL PROCESSING SYSTEM FOR INERTIAL SENSOR

(75) Inventors: Stanley F. Wyse, Encino; Daniel A. Tazartes, West Hills; Juergen K. P. Flamm, Tarzana; Charles A. Lee, Camarillo, all of CA (US)

(73) Assignee: Litton Systems, Inc., Woodland Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,311

(22) Filed: Nov. 2, 1999

Related U.S. Application Data

(63) Continuation of application No. 08/892,252, filed on Jul. 14, 1997, now Pat. No. 5,983,718.

(51) Int. Cl.[7] .......................................................... G01P 9/04
(52) U.S. Cl. ........................................ 73/504.12; 702/147
(58) Field of Search ........................... 73/504.12, 504.13, 73/504.14, 504.15, 504.16, 504.04; 702/145, 147

(56) References Cited

U.S. PATENT DOCUMENTS

| 4,445,376 | 5/1984 | Merhav . |
|---|---|---|
| 4,510,802 | 4/1985 | Peters . |
| 4,522,062 | 6/1985 | Peters . |
| 4,590,801 | 5/1986 | Merhav . |
| 4,679,434 | 7/1987 | Stewart . |
| 4,821,572 | 4/1989 | Husling, II . |
| 4,841,773 | 6/1989 | Stewart . |
| 4,996,877 | 3/1991 | Stewart et al. . |
| 5,007,289 | 4/1991 | Stewart et al. . |
| 5,065,627 | 11/1991 | Stewart et al. . |
| 5,142,921 | 9/1992 | Stewart et al. . |
| 5,168,756 | 12/1992 | Husling, II . |
| 5,400,269 | 3/1995 | White et al. . |
| 5,419,194 | 5/1995 | Varrnham et al. . |
| 5,616,864 | 4/1997 | Johnson et al. . |
| 5,987,986 | * 11/1999 | Wyse et al. ........................ 73/504.12 |

* cited by examiner

*Primary Examiner*—John E. Chapman
(74) *Attorney, Agent, or Firm*—Lynn & Lynn (57) ABSTRACT

A dithered Coriolis acceleration sensor system has a proof mass that is free of feedback in the accelerometer servo loop at the dither frequency by totally notching out all feedback torque at this frequency. The proof mass relative motion is then a direct measure of the rate because there is no feedback torque to alter the proof mass response to the acceleration. The feedback modulation system according to the invention captures the Coriolis-sensor output such that the phase and gain of the signal generated from the sensor are of no concern in maintaining good scale factor.

3 Claims, 7 Drawing Sheets

SIGNAL PROCESSING SYSTEM FOR INERTIAL SENSOR

Application under 37 C.F.R. § 1.60 of application Ser. No. 08/892,252 filed on Jul. 14, 1997, now as U.S. Pat. No. 5,983,718.

BACKGROUND OF THE INVENTION

This invention relates generally to signal processing techniques for rotation sensor systems used in navigation and other applications. More particularly this invention relates to signal processing techniques in rotation sensor systems that include Coriolis acceleration sensors for measuring rotations.

Angular rate can be measured with a captured linear accelerometer by mounting it on a vibrating frame and measuring the Coriolis accelerations generated by the angular rate of the frame relative to inertial space. Generally to attain precise angular rate measurement, the frequency response of such accelerometers must be well defined at the vibration frequency of the dithered frame. The scale factor is directly related to the accelerometer closed loop gain. Large errors can be generated from the vibration drive motion coupling into the accelerometer if the measure of this motion is not rejected by accurate control of the phase of the reference in the demodulation of the Coriolis signal.

One technique for eliminating the large errors due to uncertainties in the gain and phase of the accelerometer output is to use precision AC torque feedback to exactly cancel the Coriolis forces developed by the rate, thereby maintaining an absolute null of the proof mass at the dither frequency.

In some feedback control systems the parameter being measured varies the amplitude of a sinusoidal carrier signal. In such systems the frequency of the carrier signal is normally much higher than the desired bandwidth for the parameter being measured. Such amplitude modulated signals may be generated from sensors that measure pressure, acceleration, velocity, angular rate, and the like. For some of these sensors, precise measurement of the parameter is determined by measuring the feedback signal required to maintain a balance in a closed loop configuration.

An application where precise measurement of a modulated signal is important is a vibrating angular rate sensor system that measures the Coriolis acceleration generated by an angular rate input. A constant rate input to such a sensor causes an output signal that is amplitude modulated at the frequency of the driven oscillation of the device. The generated Coriolis acceleration is proportional to the input rate and is 90° out of phase with the driven vibration amplitude. Therefore, the maximum acceleration occurs when the maximum vibration velocity occurs, which is 90° out of phase relative to the maximum amplitude of vibration. In most cases the rate sensor is a built-in acceleration detector or a small accelerometer mounted on the vibrating member. The proof mass of the detector responds to the Coriolis acceleration generated by the rate.

If the acceleration sensor is operated in an open loop configuration, then its frequency response must generally be much higher than the driving frequency if the gain and phase of the output signal are to be well-defined. The absolute value of gain is important for scale factor, and the phase of the signal relative to the driven reference oscillation is important in order to reject any "quadrature" signal, which is a major source of error in rate measurement. This same gain and phase difficulty will also occur in closed-loop acceleration sensing if typical capture loop techniques are used.

SUMMARY OF THE INVENTION

This invention provides an acceleration sensor system having a proof mass that is made free of feedback in the accelerometer servo loop at the driven frequency by totally notching out all feedback torque at this frequency. The proof mass relative motion is then a direct measure of the rate because there is no feedback torque to alter the proof mass response to the acceleration. In such a case the proof mass is essentially responding in an open loop mode where the amplitude and phase of the motion are well defined relative to the dither drive. The acceleration sensor system according to the invention is particularly useful in sensing Coriolis accelerations.

The present invention provides a technique for overcoming the difficulties of previous feedback modulation techniques for amplitude modulated servo systems. The feedback modulation system according to the invention captures the Coriolis-sensor such that the phase and gain of the signal generated from the sensor are of no concern in maintaining good scale factor. The apparatus according to the invention includes a feedback loop connected between the output of the servo compensator and the summer. The feedback loop includes a torquing remodulator. The sensor, the demodulator, the servo compensator and the feedback loop with the torquing remodulator cooperate to produce a measured output that is independent of the gain and phase of the sensing dynamics, the demodulator and the servo compensation.

The apparatus according to the present invention for processing signals output from a Coriolis force sensor to measure angular rate comprises a demodulator connected to the sensor to receive signals indicative of the angular rate output therefrom and a servo compensator connected to receive signals output from the demodulator. The servo compensator produces a rate output signal $+\dot{e}_i \text{cir } \phi + ee \text{ (s)}$ that is indicative of the measured value of the angular rate. A feedback loop that includes a torquing remodulator is connected between the servo compensator and the sensor. The torquing remodulator applies a remodulated angular rate signal to the sensor such that the demodulator, the servo compensator and the feedback loop cooperate to produce a measured output that is independent of the gain and phase of the sensor, the demodulator and the servo compensator.

The apparatus according to the present invention for processing signals output from a sensor to measure angular rate may also be comprised of dither apparatus for driving the sensor with an oscillatory angular velocity signal of a frequency $\omega_D$ and a demodulator connected to the sensor to demodulate signals output therefrom with a signal proportional to $\cos(107_D t)$ to produce a rate output signal $+\dot{e}_i \text{cir } \phi + ee \text{ (s)}$. A feedback loop is connected between the sensor output and the dither apparatus. The feedback loop includes a servo compensator connected to receive signals output from the sensor and a notch filter connected between the servo compensator and the dither apparatus. The notch filter is arranged to reject signals of the dither frequency $\omega_D$ to make the feedback loop carry no signal that would produce feedback torque in the sensor at the dither frequency. Therefore, relative motion of the sensor is a direct measure of the angular rate.

The invention may alternatively comprise a high pass filter connected to the sensor pickoff and an in-phase signal processing channel connected to the high pass filter. The in-phase signal processing channel preferably includes a cosine demodulator arranged to receive signals output from the high pass filter and a first servo compensation circuit connected to the cosine demodulator to produce a rate measurement signal. A cosine remodulator is connected to the first servo compensation circuit. A quadrature-phase signal processing channel is connected to the high pass filter. The quadrature-phase signal processing channel includes a sine demodulator arranged to receive signals output from the high pass filter and a second servo compensation circuit connected to the sine demodulator. A sine remodulator is connected to the servo compensation circuit. A first summer is connected to the cosine remodulator and to the sine remodulator. An acceleration feedback loop is connected between the sensor pickoff and the second summer. The acceleration feedback loop includes a notch filter arranged to reject signals of the dither frequency $\omega_D$ to make the feedback loop carry no signal that would produce feedback torque in the sensor at the dither frequency, such that relative motion of the sensor is a direct measure of the angular rate, and such that the notch filter produces a signal indicative of the acceleration. A second summer is connected between the first summer and the notch filter. The second summer has an output connected to the sensor for applying to the sensor a feedback signal that is the sum of signals output from the in-phase channel, the quadrature-phase channel and the acceleration feedback loop.

The invention may alternatively comprise a demodulator connected to the high pass filter to receive the filtered sensor signal and produce a signal indicative of the angular rate. A feedback loop is connected between the output of the sensor pickoff and the accelerometer. The feedback loop includes a notch filter arranged to reject signals of the dither frequency $\omega_D$ to make the feedback loop carry no signal that would produce feedback torque in the sensor at the dither frequency.

An appreciation of the objectives of the present invention and a complete understanding of its structure and method of operation may be had by studying the following description of the preferred embodiment and by referring to the accompanying drawings.

DESCRIPTION OF THE PREFERRED EMBODIMENT

The capture loop according to the invention is particularly useful in angular rate sensor systems, but is not limited in application to angular rate sensors. It should be noted that the capture loops described herein may be used with sensors for measuring pressure, temperature, velocity, etc. The capture loop according to the invention also applies to sensors that are amplitude modulated by the parameter being sensed.

Figure 1:
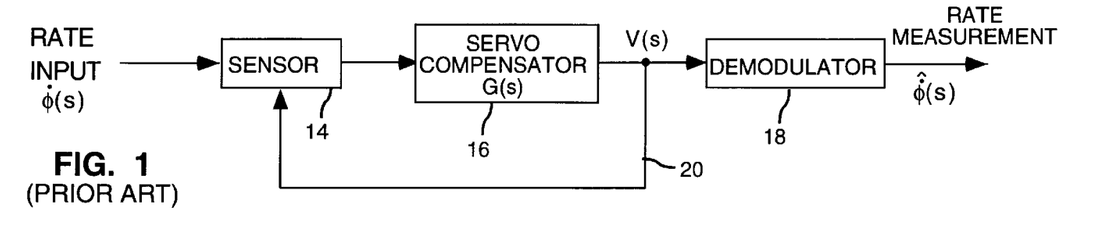
FIG. 1 is a block diagram of a prior art loop for capturing the signal output from a sensor in a rate measuring device.

FIG. 1 illustrates a prior art capture loop that has been used in processing signals output from angular rate sensor systems. A rate input $\dot{\phi}(s)$ is applied to a sensor 14 such as a linear accelerometer. Sensors that may be used in FIG. 1 are disclosed in U.S. Pat. Nos. 4,679,434; 4,841,773; 5,065,627; and 5,142,921, the disclosures of which are hereby incorporated by reference into this disclosure. Sensors included in other capture loops described subsequently may be similar to the sensor 14.

The sensor 14 is driven by a dither or modulating signal so that the rate input $\dot{\phi}(s)$ is modulated by $\cos(\omega_D t)$ where $\omega_D$ is the drive frequency for the sensor and t is the time. The sensor 14 is connected to a servo compensator 16, which multiplies signals input thereto by a function G(s) and provides an output signal V(s). The signal V(s) is fed back to the sensor 14. The sensor 14 responds according to its dynamic response function A(s) to the sum of the modulated rate input signal and the feedback signal V(s). The signal V(s) is also input to a demodulator 18 that demodulates the signal V(s) with the signal $\cos(\omega_D t)$. The output of the demodulator 18 is the measured rate $+\dot{e},\bar{cir}\,\dot{\phi}+ee$.

The signal input as seen by the sensor 14 for a constant input rate oscillates at the driving frequency $\omega_D$. The signal from the output from the sensor 14 is then amplified by the servo compensation G(s) and fed back in an attempt to cancel the rate input $\dot{\phi}(s)$. The signal fed back to the sensor 14 is a measure of the input rate. Because the output V(s) output from the servo compensator is a signal at the vibration frequency, the signal V(s) is demodulated to obtain a constant value that represents the constant input rate.

The capture loop technique of FIG. 1 exhibits the deficiencies of the prior art discussed in the background of the invention of this disclosure. Referring to FIG. 1, the frequency response of the sensor 14 and the servo compensator 16 becomes very critical, especially at the drive frequency $\omega_D$. For typical instruments this frequency is in the 1 kHz to 20 kHz range, but many acceleration detectors do not have well-defined outputs at such frequencies. Therefore, if two such sensors are being used to achieve the good common mode rejection required in a vibration environment, they must be matched quite well, in both gain and phase, at the drive frequency. If the sensors are not well matched, then the difference that results for the vibration inputs will be interpreted as an angular rate. In essence, the output is very sensitive to the sensor dynamics and the servo frequency response.

Figure 2:
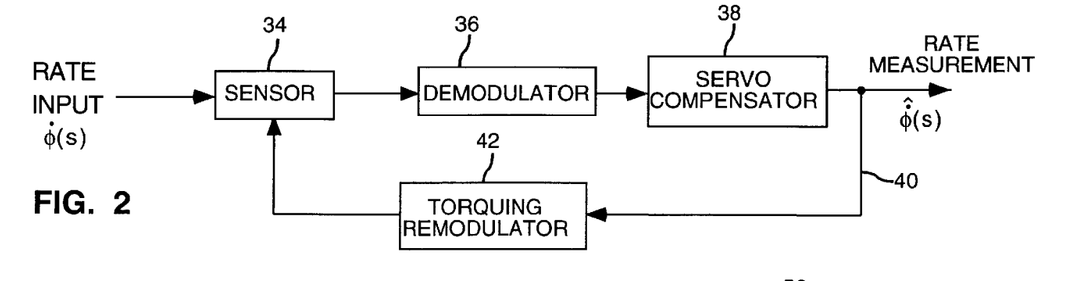
FIG. 2 is a simplified block diagram of a first capture loop according to the invention.

Referring to FIG. 2, there is shown a capture loop according to the invention. The rate input signal $\dot{\phi}(s)$ is input to a sensor 34 that effectively multiplies the rate input signal $\dot{\phi}(s)$ by $\cos(\omega_D t)$ in the manner described above with reference to FIG. 1. The sensor output signal is input to a demodulator 36 that demodulates the sensor signal with the signal $\cos(\omega_D t)$. Signals output from the demodulator 36 are input to a servo compensator 38, which provides the measured rate signal $\dot{\phi}(s)$. The servo compensator preferably has a gain $G(j\omega)$ such that $G(j\omega)|_{107 \to 0} \to \infty$. The measured rate signal $+\dot{e},\bar{cir}\,\dot{\phi}+ee$ (s) is input to a feedback loop 40 that includes a torquing remodulator 42 that modulates the signal $+\dot{e},\bar{cir}\,\dot{\phi}+ee$ (s) with $\cos(\omega_D t)$. Signals output from the torquing remodulator 42 are then input to the sensor 34 to complete the feedback loop 40.

The capture technique illustrated in FIG. 2 is far superior to that of FIG. 1 in making accurate measurements of the rate input φ(s). It should be noted that the apparatus of FIG. 2 is similar to that of FIG. 1 except that the demodulation occurs inside the feedback loop, and the feedback is a remodulated signal that has been processed by the servo compensator 38, which amplifies signals input thereto by G(s). The system of FIG. 2 operates by completely suppressing all relative motion of the proof mass of the sensor 34 from the Coriolis acceleration and measuring the torque required to do this.

The output +ė,cir φ+ee (s), before remodulation, is an accurate measure of the input φ(s). The signal +ė,cir φ+ee (s) is substantially independent of the gain and phase characteristics of the sensing element dynamics A(s) or the servo compensation gain G(s). This condition is true if the gain G(s) approaches infinity as the frequency approaches 0, i.e., if the servo compensation includes integral gain. In essence, because of this infinite gain, the AC feedback signal exactly nulls the signal generated by the input rate, and the DC signal +ė,cir φ+ee (s) is an accurate measure of this AC signal. The rate input measurement is basically unaffected by changes in the dynamic behavior of the sensing dynamics A(s), the servo compensation G(s) or phase or gain shifts through the demodulator 36. It is important, however, for the remodulated feedback torque to be proportional to, and in phase with, the Coriolis acceleration that is being generated by the input rate.

The output from the capture loop must be insensitive to the gain and phase of the internal dynamics of the loop to provide good common mode rejection of any linear vibration inputs near the frequency of the driven oscillation.

If only one sensor is used for detection of the angular rate, there is no way to distinguish the rate signal from signals generated by linear vibration inputs from the environment at, or near, the drive frequency. Therefore, most sensors are designed with at least two sensors which vibrate in opposition to one another such that their velocity vectors are 180° out of phase with each other. When angular rates are applied to such a sensor, the output Coriolis signals are also out of phase with one another. The signals are in phase for linear vibration inputs. Therefore the angular rate signals can be discriminated from vibration inputs by summing and differencing the signals.

It should be noted that the errors and sensitivities of the prior art apparatus of FIG. 1 are not associated with the capture loop according to the embodiment of the invention shown in FIG. 2. The outputs for each sensor are essentially independent of the gain and phase of the sensor 34, the demodulator 36 and the servo compensator 38. The demodulator reference input can be nominally phase adjusted, however, to maximize the output for typical sensing element dynamics A(s), and to optimize the capture loop stability, bandwidth, and overall performance.

Figure 3:
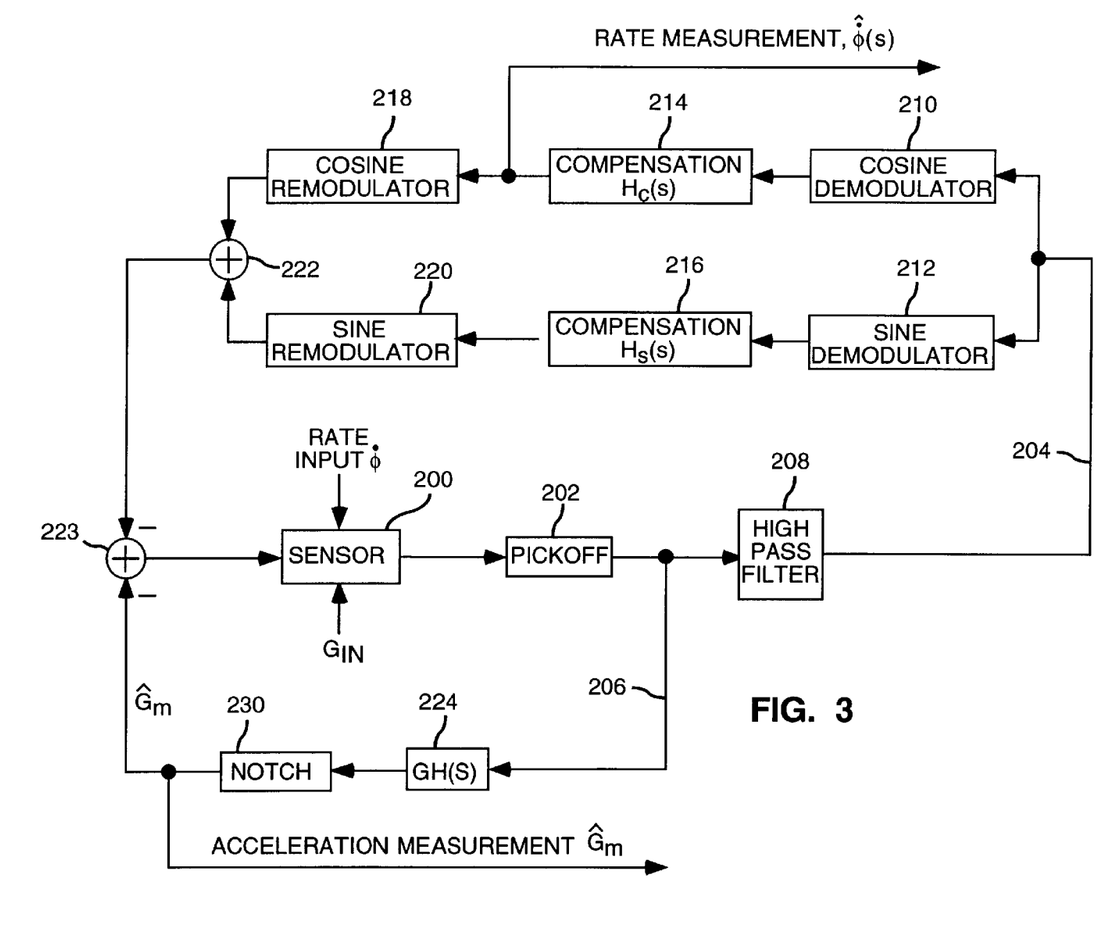
FIG. 3 is a more detailed block diagram of the first capture loop of FIG. 2.

FIG. 3 illustrates the capture loop technique of FIG. 2 in greater detail. The angular rate input +ė,cir φ+ee (s) and the acceleration $G_{IN}$ are applied to an accelerometer 200. The accelerometer preferably is a pendulum-type device that may be functionally described by the transfer function $$\text{AccelDynamics} = \frac{1}{Is^2 + Ds + K}. \quad (1)$$

A signal pickoff device 202 is connected to the sensor 200. The sensor 200 may include an accelerometer pendulum as well-known in the art. The signal pickoff device 202 produces a pickoff signal that is indicative of the accelerometer pendulum angle θ. Signals output from the pickoff device 202 are input to a rate capture loop 204. Signals output from the pickoff device 202 are also input to an acceleration capture loop 206.

The rate capture loop 204 includes a high pass filter 208 connected to the output of the pickoff device 202. After filtering by the high pass filter 208, the pickoff signal is input to a first demodulator 210 that demodulates the pickoff signal with cos($\omega_D t$). The pickoff signal is also input to a second demodulator 212 that demodulates the pickoff signal with sin($\omega_D t$). The signal output from the cosine demodulator 210 is input to a compensator 214 that applies a function $H_c(s)$ to signals input thereto. The signal output from the sine demodulator 212 is similarly input to a compensator 216 that applies a function $H_s(s)$.

The signal output from the compensator 214 is the angular rate measurement +ė,cir φ+ee (s). The signal output from the compensator 214 is input to a cosine remodulator 218 that remodulates the signal +ė,cir φ+ee (s) with cos($\omega_D t$). Similarly the signals output from the compensator 216 are input to a sine remodulator 220 that remodulates signals input thereto with sin($\omega_D t$).

The remodulated signals output from the remodulators 218 and 220 are then combined in a summer 222. The sum of the remodulated signals is inverted and input to a summer 223 as a negative feedback signal.

The gain and phase of the pickoff device 202 are not important in the rate capture loop because the pick off signal is totally nulled. Demodulation and remodulation can be accomplished by digital multipliers, analog multipliers or by switching full-wave demodulators. Full torque feedback at the dither frequency totally suppresses the pendulum motion at the dither frequency $\omega_D$.

The acceleration capture loop 206 includes an amplifier 224 that applies a gain GH(s) to the signal output from the pickoff device 202. The amplified pickoff signal is then input to a notch filter 230, which rejects signals at the dither frequency. The output of the notch filter circuit 230 is a signal $\hat{G}_m$ which is indicative of the measured acceleration. The measured acceleration signal $\hat{G}_m$ is inverted and input to the summer 223. The notch filter 230 inhibits any feedback at the dither frequency in the acceleration feedback loop 206.

Figure 4:
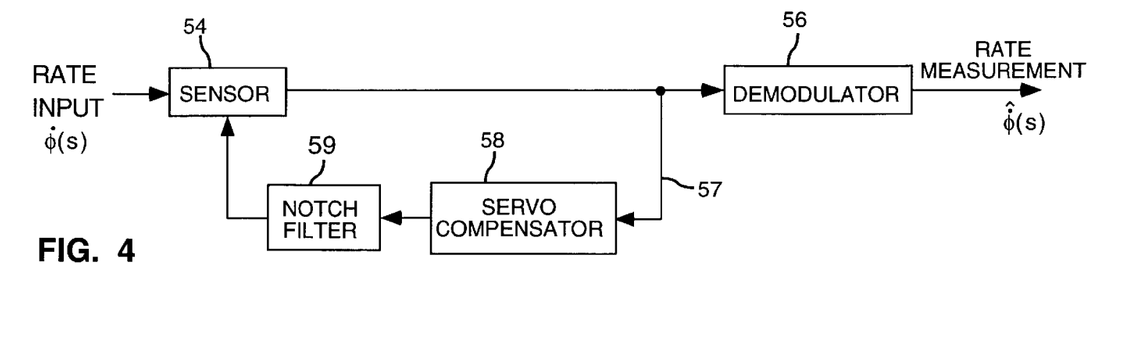
FIG. 4 is a simplified block diagram of a second capture loop according to the invention.

FIG. 4 illustrates a second capture loop according to the invention. A sensor 54 receives a rate input signal φ(s) that is indicative of an input Coriolis acceleration. The output of the sensor 54 is input to a demodulator 56 that demodulates the sensor output signal with a signal that is proportional to cos $\omega_D t$ to produce the rate measurement signal +ė,cir φ+ee (s). The signal indicative of the pickoff angle from sensor 54 is input to a feedback loop 57 that includes a servo compensation circuit 58. The servo compensation circuit 58 provides a compensated measurement signal to a notch filter circuit 59 that rejects signals at the dither frequency. The output of the notch filter circuit is then input to the sensor 54 to provide the feedback signal.

FIG. 4 illustrates a device that operates closed loop for the acceleration and open loop for the rate. The embodiment of the invention of FIG. 4 allows the proof mass to be completely free of any feedback signal in the servo loop 57 at the drive frequency by totally notching out all feedback torque at the driving frequency. The motion of the proof mass is then a direct measure of the rate because there is no feedback torque to alter the response of the proof mass to the Coriolis acceleration. In this case, the proof mass is essentially responding in an open loop mode where the amplitude and phase of the motion are well-defined relative to the dither drive. It should be noted that low frequency accelerations acting on the proof mass are also captured through servo loop 57.

Figure 5:
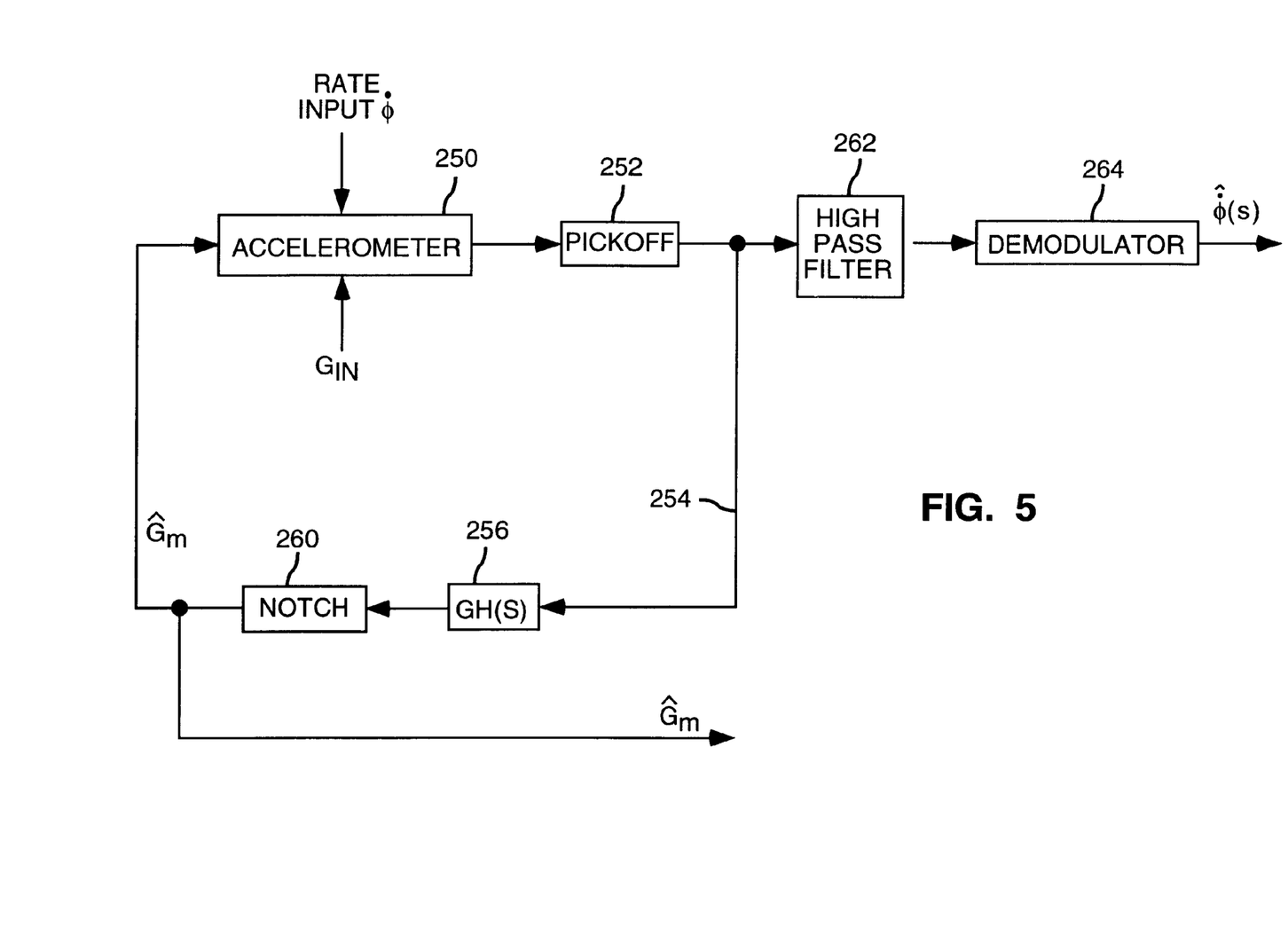
FIG. 5 is a more detailed block diagram of the first capture loop of FIG. 3.

FIG. 5 illustrates additional features of the invention as shown in FIG. 4. The rate input $+\dot{e},\overline{cir}\ \dot{\phi}+ee$ (s) and the input acceleration $G_{IN}$ are input to an accelerometer 250, which may also be functionally described by the transfer function given above in Eq. (1). The accelerometer 250 may be included in the sensor 54 of FIG. 4.

The signal output from the accelerometer 250 is the angle θ, which is input to a pickoff device 252. Signals output from the pickoff device 252 are input to an acceleration capture loop 254, which includes a compensator 256 and a notch filter 260, which may be similar to the compensator 224 and the notch filter 230 of FIG. 3. The output of the notch filter circuit 230 is a signal $\hat{G}_m$, which is indicative of the measured acceleration. The measured acceleration signal $\hat{G}_m$ is inverted and input to accelerometer 250 as negative feedback torque to null the pendulum motion.

The output of the pickoff device 252 is input to a high pass filter 262, which filters the pickoff signal and then inputs it to a demodulator 264. The demodulator 264 demodulates the filtered pickoff signal with $\cos(\omega_D t)$, which produces the rate measurement $+\dot{e},\overline{cir}\ \dot{\phi}+ee$ (s).

In the embodiments of the invention shown in FIGS. 4 and 5, there is no torque feedback at the dither frequency. The proof mass, or pendulum, is completely free to respond to only the Coriolis forces. Therefore, the dynamics of the pendulum are important in terms of the gain and phase response to Coriolis accelerations. However, much of the circuitry required to implement the embodiment of the invention shown in FIGS. 2 and 3 is eliminated, which provides a significant cost reduction. The acceleration input is still captured by a low frequency rate loop that has a notch filter. The notch filter 260 rejects signals of the dither frequency in the feedback loop 254 to prevent contamination of the feedback signal.

The capture loop of FIG. 2 operates by completely suppressing all relative motion of the proof mass from the Coriolis acceleration and measuring the torque required to do this. The capture loop of FIG. 4 allows the proof mass to be completely free to respond to the Coriolis acceleration and measures its relative motion. A combination of the two conditions of FIGS. 2 and 3 should not occur together because then neither the torque fed back, nor the proof mass motion is a true measure of the Coriolis acceleration generated by the angular rate input.

Figure 6:
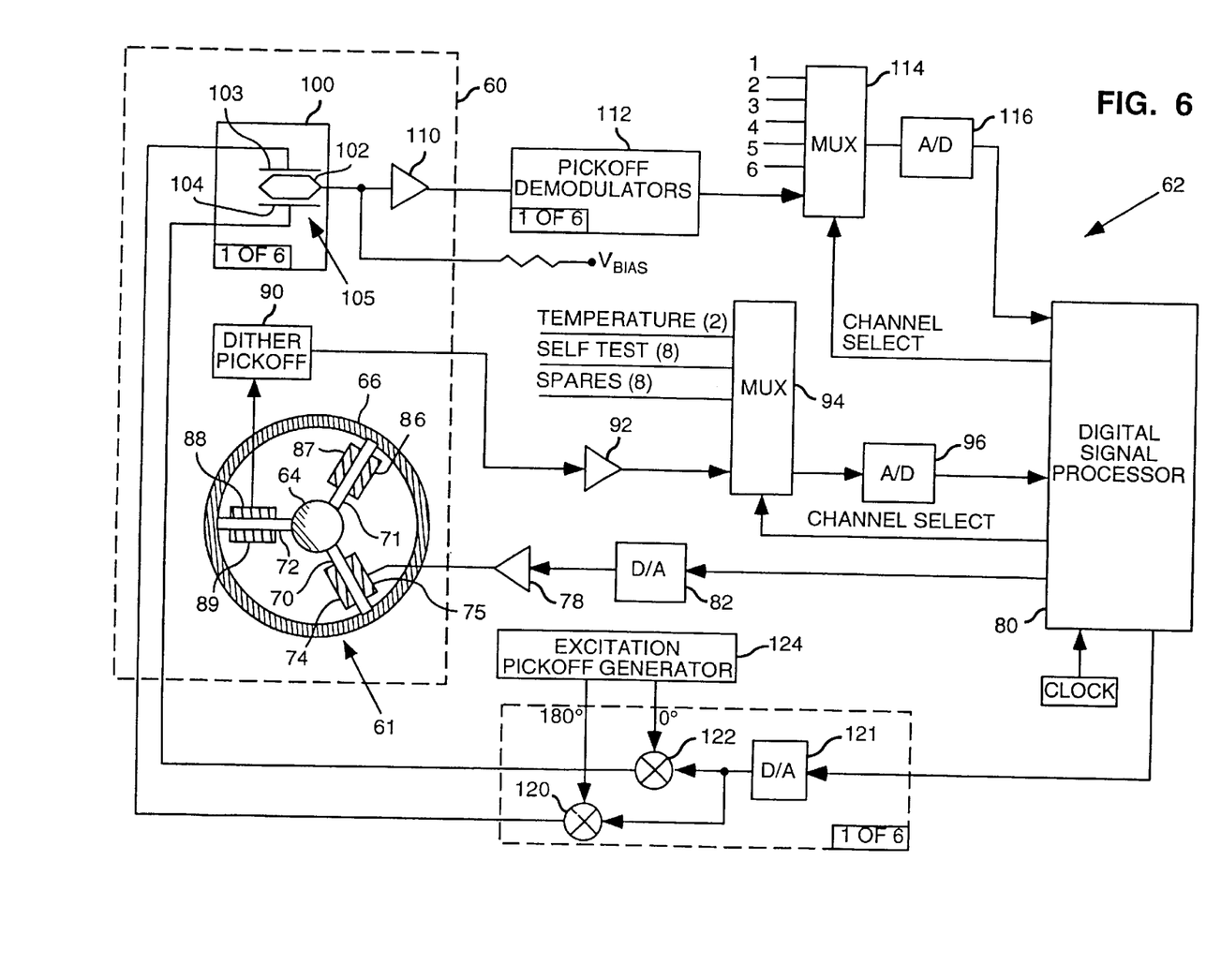
FIG. 6 is a block diagram of a multisensor rotation sensor and signal processing circuitry according to the invention.

Referring to FIG. 6, there is shown a block diagram of a multisensor assembly system 60 and associated signal processing circuitry 62. A dither assembly 61 is arranged to mechanically dither the multisensor assembly system 60. The dither assembly 61 includes a central rotor 64, an outer ring 66 and a plurality of vanes 70–72 that extend between the central rotor 64 and the outer ring 66. The vane 70 has a pair of piezoelectric drivers 74 and 75 mounted on opposite sides thereof. Drive current is provided to the drivers 74 and 75 by means of a dither drive amplifier 78 that is connected to a digital signal processor 80 via a digital-to-analog converter 82.

FIG. 6 is a schematic illustration of the accelerometer 100 and the dither assembly 61. In actual practice, the multisensor assembly 60 includes two dither assemblies similar to the dither assembly 61 for each axis. An accelerometer is mounted to each of the three vanes of the two dither assemblies as disclosed in U.S. Pat. No. 5,065,627, which issued Nov. 19, 1991 to Stewart et al. The disclosure of U.S. Pat. No. 5,065,627 is hereby incorporated by reference into the present disclosure. The two dither assemblies are mounted on a common rotor and dithered 180° out of phase as disclosed in U.S. Pat. No. 5,065,627.

The drive currents to the two piezoelectric drivers 74 and 75 have a phase relationship that causes one of the drivers 74, 75 to expand while the other contracts. The phase relationship of the drive currents to the vane 70 causes small-amplitude oscillatory motion of the vane 70 in the plane of the paper of FIG. 6. The vanes 71 and 72 have pairs of piezoelectric drivers 86, 87 and 88, 89, respectively, which also receive drive currents identical to the drive currents supplied to the drivers 74 and 75. The vanes 70–72 thus oscillate in phase, with the result being an oscillatory rotational motion of the ring 66 about an axis through the central hub 64 and perpendicular to the plane of the paper.

A dither pickoff sensor 90, which may be a magnetic or piezoelectric pickoff device, produces electrical signals indicative of angular oscillation of the ring 66. Signals from the dither pickoff sensor 90 are input to an amplifier 92. Signals output from the amplifier 92 are input to a multiplexer 94, which is connected to the digital signal processor 80 through an analog-to-digital converter 96.

The multisensor assembly 60 of FIG. 6 also includes a linear accelerometer 100. As indicated in FIG. 6, the multisensor assembly 60 preferably includes five additional linear accelerometers (not shown) that are essentially identical to the linear accelerometer 100. The linear accelerometer 100 may comprise a pendulum device that includes a proof mass 102 comprising a dielectric material suspended between two plates 103, 104 of a capacitor 105. The capacitance of the capacitor 105 is related to the position of the proof mass relative to the capacitor plates.

Signals indicative of the position of the pendulum are input to a preamplifier 110, which has an output connected to a pickoff demodulator 112. Signals output from the pickoff demodulator 112 are input to a multiplexer 114 that is interfaced to the digital signal processor 80 through an analog-to-digital converter 116.

The capacitor plates receive electrical signals from a pair of summers 120 and 122 that are connected to the digital signal processor 80 through a digital-to-analog converter 121. A pickoff excitation circuit 124 supplies signals that are 180° out of phase to the summers 120 and 122, which add the signals from the digital-to-analog converter 121 to the outputs of the pickoff excitation circuit 124.

Figure 7:
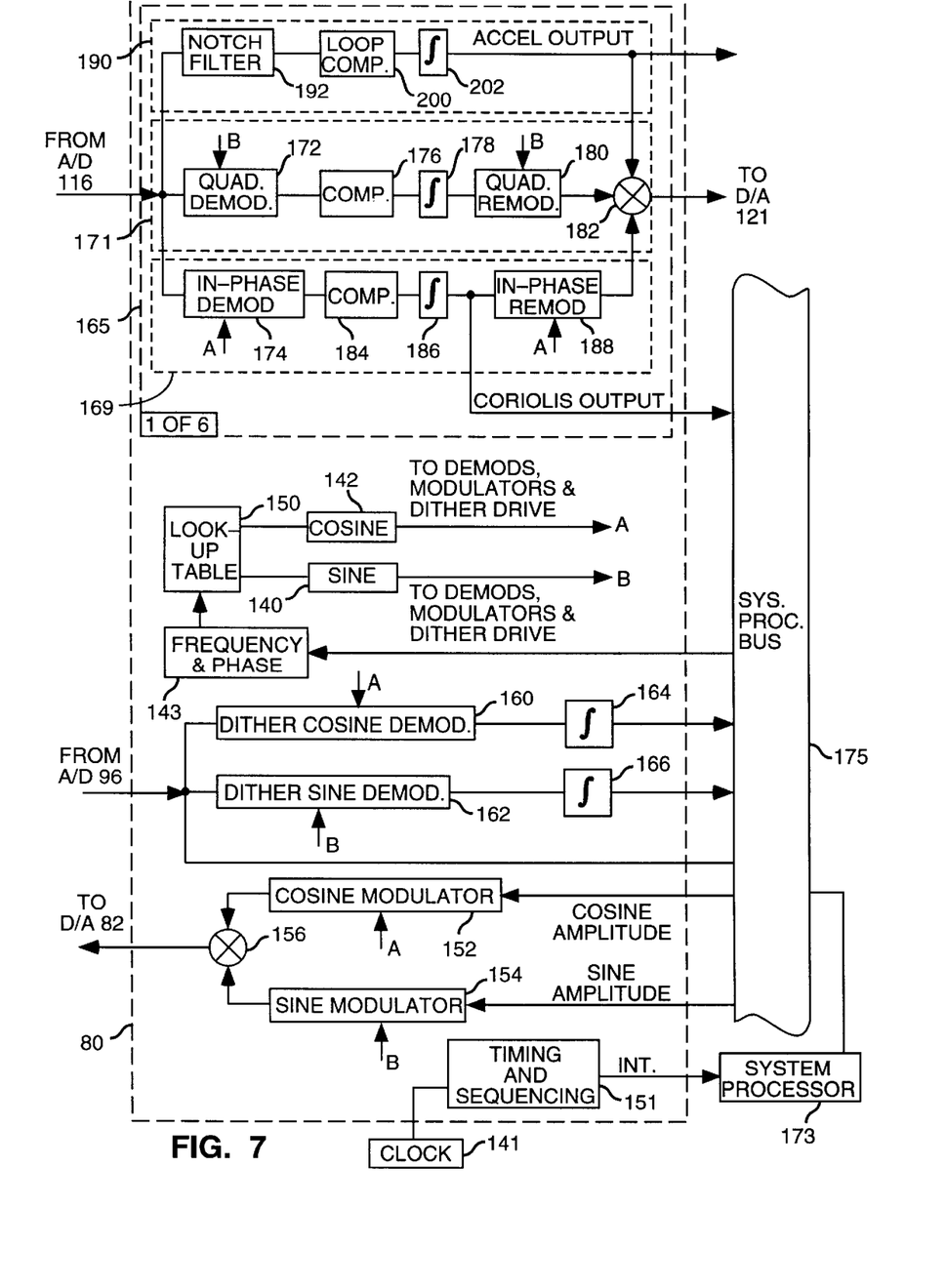
FIG. 7 is a block diagram of a digital signal processor that may be included in the circuitry of FIG. 6.

FIG. 7 illustrates a structure for the digital signal processor 80. The digital signal processor 80 provides system digital frequency control in a manner that provides high accuracy, low power consumption, and extremely low cost.

The digital signal processor 80 receives a master clock signal from system clock 141. This clock establishes the timing sequence in logic block 151 to perform the functions described below and to generate interrupts to the system processor 173 synchronized with the information provided across the system processor bus 175.

The digital signal processor 80 synthesizes reference sine and cosine waveform outputs 140 and 142, respectively, utilizing a cyclic lookup table 150. An index from a frequency and phase indicator 143 points to the current location in the lookup table 150. The index is incremented at each update interval, (i.e., ⅛ of a dither period) in order to construct the digital waveform. These sine and cosine reference waveforms serve as precision phase references for the various portions of the controller circuitry 80.

A cosine modulator 152 multiplies the digitized reference cosine waveform by the cosine amplitude. The system processor 173 has control over the sine and cosine amplitudes. A sine modulator 154 multiplies the digitized reference sine waveform by the sine amplitude received from the system processor bus 175. The outputs of the cosine demodulator 152 and the sine demodulator 154 are vectorially combined by a summer 156 to provide a single waveform with a specified amplitude and phase that is input to the digital-to-analog converter 82.

The output of the digital-to-analog converter 82 is the dither drive voltage that is applied to the appropriate set of piezoelectric bimorphs on each multisensor rotor 64. The piezoelectric drivers 74–75, 86–87 and 88–89 alternately expand and contract, thereby imparting angular motion on each rotor-mounted accelerometer cluster. This mechanization provides a synthesized excitation means for providing the dither motion with the ability to control amplitude, phase, and frequency.

For pickoff sensing, the pickoff 90 senses the dither amplitude of the ring 66 and relays this information back to the digital signal processor 80 via the multiplexer 94 and the analog-to-digital converter 96. The dither pickoff signal is demodulated by a dither cosine demodulator 160 with the reference cosine waveform. The dither pickoff signal is also demodulated by a dither sine demodulator 162 with the reference sine waveform. This demodulation is done in order to determine the amplitude and phase of the dither velocity. The outputs of the demodulators 160 and 162 are integrated by integrators 164 and 166, respectively. The demodulated and integrated information is supplied to the system processor bus 175 for amplitude and frequency control.

The dither angular velocity θ relative to torque T applied is given by:

$$\frac{\dot{\theta}}{T} \propto \frac{s}{1 + \frac{s}{Q\omega_0} + \left(\frac{s}{\omega_0}\right)^2} \quad (2)$$

where $\omega_0$ is the resonant frequency in rad/sec. At resonance, $\dot{\theta}$ and T are in phase with one another. At frequencies above resonance, T leads $\dot{\theta}$; and at frequencies below resonance, T lags $\dot{\theta}$. Thus, the phase relationship between T and $\dot{\theta}$ is a discriminant for the resonant frequency.

In order to achieve the proper signal relationships, the torque phase is adjusted in closed-loop fashion so as to obtain a dither angular velocity e that is entirely in phase with the cosine waveform output from the table 150. The phase of the torque drive is then observed. If a significant quadrature (i.e., sine) component is required, then the frequency is stepped up or down one increment (for example, 1 Hz), depending on the polarity of the quadrature demodulator. This ensures that the dither frequency will always remain close to resonance.

The sum of the squares of the signals output from the pickoff demodulators 160 and 162 is proportional to the dither angular velocity. The dither angular velocity is controlled to a specified value that sets the angular rate scale factor of the multisensor device. Amplitude and phase control preferably take place at a 600 Hz rate in the system processor. Frequency control preferably takes place at a 0.5 Hz rate in the system processor.

In order to ensure sufficient bandwidth for restoring the accelerometer 100, a high frequency excitation (e.g., 250 kHz) is applied to the accelerometer torquers. Signals picked off from the accelerometer 100 are demodulated by the pickoff demodulators 112 to yield a signal proportional to the deviation from null. Each of the pickoff signals is amplified and provided to the A/D converter 116 via the multiplexer 114.

Each of six accelerometer pickoff signals is digitized by the A/D converter 116. The rate of digitizing preferably is 19.2 kHz. The digitized accelerometer pickoff signals are provided to the digital signal processor 80 for input to pickoff signal processing circuitry 165 that includes a pair of rebalance paths 169 and 171. The rebalance path 169 is an in-phase channel, and the rebalance path 171 is a quadrature phase channel.

The rebalance path 190 is a low frequency channel which counters the effect of linear acceleration on the proof masses 102. The rebalance paths 169 and 171 are channels which operate on the dither carrier signal and which null the Coriolis forces acting on the proof masses 102. The use of digital feedback channels prevents the accumulation of errors due to offsets in analog electronics and, in particular, eliminates these errors from the demodulation process performed on the angular rate signal.

Still referring to FIG. 7, in the quadrature channel 171, signals from the analog-to-digital converter 116 are input to a quadrature phase demodulator 172, which receives its reference signal from the sine generator 140. The signals output from the quadrature phase demodulator 172 are input to a compensator circuit 176 and then integrated by an integrator 178. Signals output from the integrator 178 are then input to a quadrature phase remodulator 180, which also receives its reference signal from the sine generator 140. The output of the quadrature phase remodulator 180 is input to an arithmetic logic unit (ALU) 182.

In the in-phase channel 169, signals from the analog-to-digital converter 116 are input to an in-phase demodulator 174, which receives its reference signal from the cosine generator 142. Signals from the in-phase demodulator 174 are fed into a compensator 184 and then integrated by an integrator 186. The signal output from the integrator 186 is the Coriolis acceleration output, which is supplied to the system processor bus 175. Signals output from the integrator 186 are also input an in-phase remodulator 188, which also receives its reference signal from the cosine generator 142. The output of the in-phase remodulator 188 is connected to the ALU 182.

Signals from the analog-to-digital converter 116 are also input an acceleration loop 190. The acceleration loop 190 includes a digital notch filter 192, which operates on the digitized pickoff signal received from the analog-to-digital converter 116 to reject signal components at the dither frequency. The resulting filtered signal is processed through a digital loop compensator 200 and then integrated by an integrator 202. The acceleration loop 190 has integral gain in order to provide an acceleration feedback signal output from the integrator 202 and input to the system processor bus 175 and to the ALU 182. The signals output from the ALU 182 are input to the digital-to-analog converter 121, which is part of the drive circuitry for the accelerometers 100.

This acceleration feedback signal is proportional to the average acceleration (or ΔV) over the update timer interval of approximately 50 μs. The six outputs of this form represent the accelerations measured along the accelerometer chip input axes.

The Coriolis acceleration, which is proportional to angular rate is in phase with the dither angular velocity. However, coupling of the tangential dither acceleration into the accelerometers 100 could potentially lead to a large undesired quadrature component at the dither frequency. As discussed previously, both the quadrature and in-phase components need to be nulled to prevent errors due to pickoff phase shifts.

The in-phase remodulator 188 is synchronized to the dither pickoff frequency. The combination of the compensator 184 followed by the summer 186 has integral gain to supply a measure of the Coriolis acceleration and set the amplitude for the in-phase remodulator 188, which drives the Coriolis component to null. The amplitude is updated once every dither cycle in order to ensure sufficient loop bandwidth. This amplitude is representative of the average angular rate over one dither cycle.

The quadrature channel 171 contains no information about the Coriolis acceleration, but the application of the demodulated quadrature signal ensures the accelerometer pickoff signal will remain at null. Thus, the amplitude of the quadrature remodulator 180 is also updated once every dither cycle. The in-phase, quadrature, and low frequency signal components from the acceleration loop are all added together in the ALU 182. The output of the ALU 182 is a digital word which is applied to the digital-to-analog converter 121, which preferably is a high precision D/A converter of the type used in compact disc players. Conversion takes place at 20 kHz to allow sufficient time resolution for reconstitution of the 2 kHz dither waveform.

The output of the D/A converter is used to generate a positive and negative voltage using linear amplifiers in inverting configuration. A high frequency (typically about 250 kHz) pickoff excitation from the pickoff excitation generator 124 is added and subtracted to the positive and negative signal paths. The combined signals are then applied to the top and bottom torquing plates of the accelerometer. The use of differentially applied plate voltage along with a voltage present on the pendulum causes an electrostatic force to be developed, canceling the force generated by both linear and Coriolis acceleration components and thereby maintaining the pickoff at null.

Figure 8:
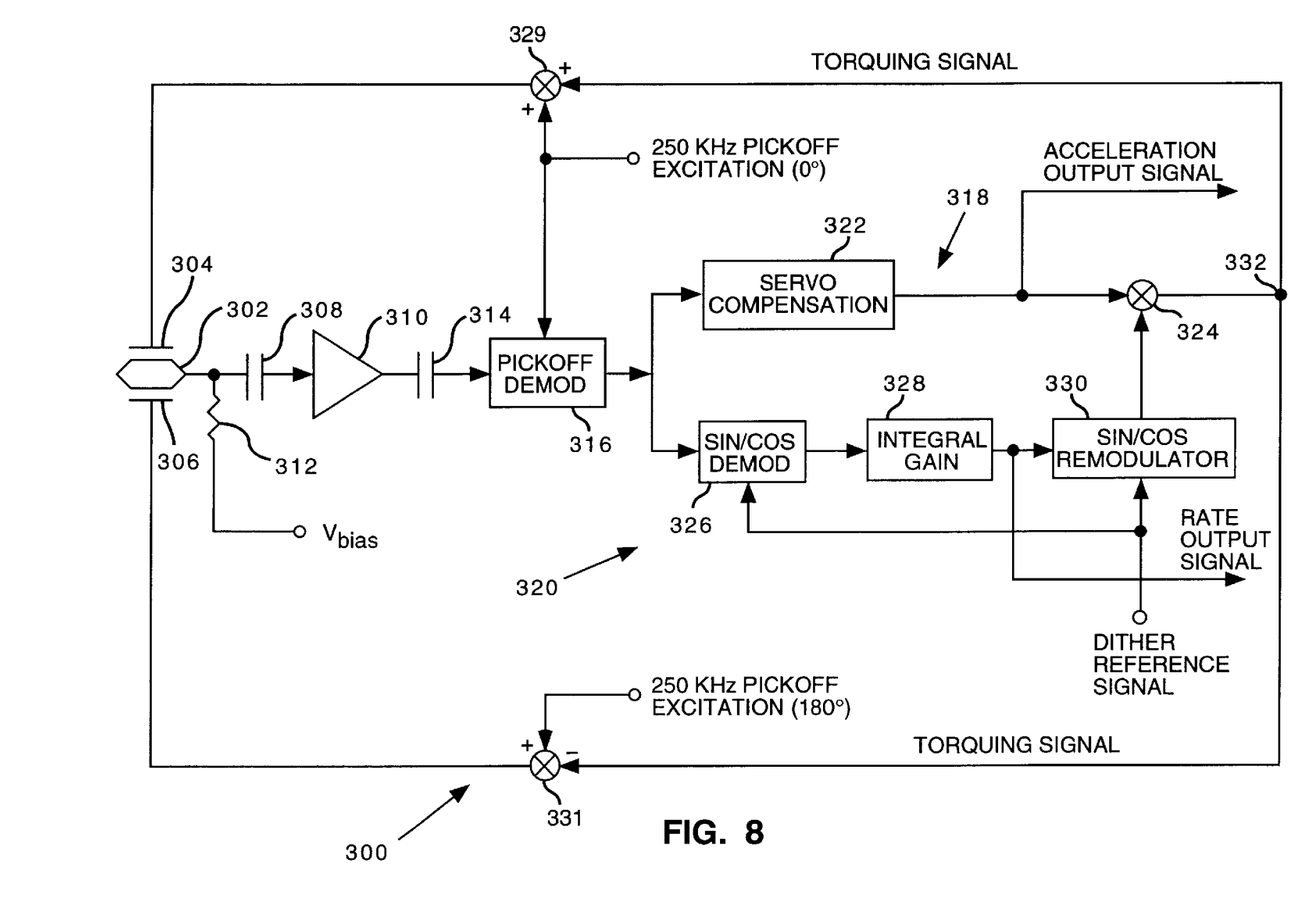
FIG. 8 illustrates analog circuitry according to the present invention for processing signals output from a Coriolis sensor.

FIG. 8 illustrates an analog system 300 for processing Coriolis signals output by movement of a proof mass 302 between a pair of capacitor plates 304 and 306. It is to be understood that the proof mass 302 and the capacitor plates 304 and 306 are merely exemplary of a Coriolis force sensor. In actual practice a sensor structure similar to that disclosed in U.S. Pat. No. 5,065,627 would be preferred for practicing the invention. A capacitor 308 couples the sensor output signal to an amplifier 310. A voltage $V_{bias}$ is applied to the proof mass 302 via a resistor 312.

The amplified sensor output signal passes through a capacitor 314 to a pickoff demodulator 316. A first pickoff excitation signal is applied to the pickoff demodulator 326 and to the capacitor plate 304 via summer 329. A second pickoff excitation signal is applied to the capacitor plate 306 via summer 331. The second pickoff excitation signal is 180° out of phase with the first pickoff excitation signal. The pickoff excitation signals preferably have a frequency of 250 KHz.

The pickoff demodulator 316 provides signals to an acceleration capture loop 318 and to an angular rate capture loop 320. The acceleration capture loop 318 includes a servo compensation circuit 322, which produces an acceleration output signal. The acceleration output signal is input to a summer 324.

The angular rate loop 320 includes a sine/cosine demodulator 326 that is connected to the pickoff demodulator 316 to receive the signal output therefrom. Signals output from the sine/cosine demodulator 326 are input to an integral gain circuit 328. The signal output from the integral gain circuit 328 is the rate output signal. The rate output signal is input to a sine/cosine remodulator circuit 330. A dither reference signal is input to the sine/cosine remodulator circuit 330 and to the demodulator circuit 326.

Signals output from the sine/cosine modulator 330 circuit are input to the summer 324. The summer 324 adds the acceleration output signal and the modulated angular rate signal and provides a torquing feedback signal to a junction 332 that is connected to the summers 329 and 331. Summer 329 adds torquing feedback signal 332 to the 0° pickoff excitation signal, and summer 331 subtracts feedback signal 332 from the 180° pickoff excitation.

Figure 9:
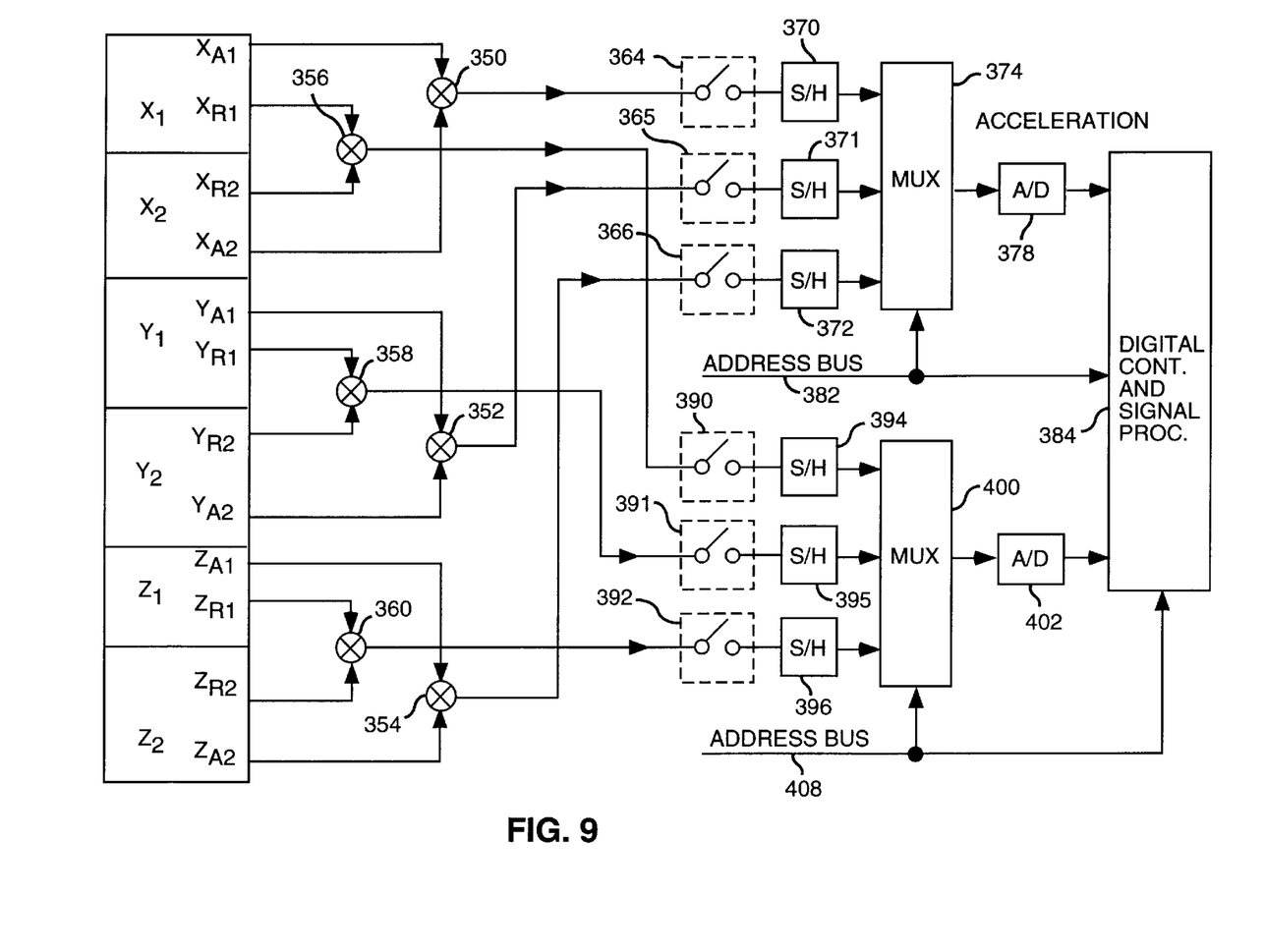
FIG. 9 illustrates digital circuitry according to the present invention for processing signals output from a Coriolis sensor.

FIG. 9 illustrates a digital system for processing the sensor output signals. As shown in FIG. 6, the complete sensor system includes six acceleration sensors. Six sensors are used to obtain signals indicative of the angular rate and acceleration for each of three mutually perpendicular axes.

For the x-axis the sensor system produces signals X1 and X2. These signals have components $X_{A1}$, and $X_{R1}$, and $X_{A2}$ and $X_{R2}$, respectively. The sensor system produces similar signals for the y-axis and the z-axis for a total of twelve signals. These signals result from FIG. 8 which illustrates measurement of the rates and accelerations. For a dual rotor, counter-dithered system having two sets of sensors for each axis, the corresponding rate and acceleration signals may be dithered 180° out of phase to achieve a high degree of common mode rejection of high frequency linear and angular vibrations. In a digital processing system, all signal processing of the rate and acceleration signals occurs in the system processor 384 without additional electronics being required.

The signals $X_{A1}$ and $X_{A2}$ are combined by a summer 350 to produce an acceleration signal $X_A$. The signals $Y_{A1}$ and $Y_{A2}$ and the signals $Z_{A1}$ and $Z_{A2}$, are combined by summers 352 and 354, respectively. The summers 352 and 354 produce acceleration signals $Y_A$ and $Z_A$ respectively.

The signals $X_{R1}$ and $X_{R2}$ are combined by a summer 356 to produce a signal $X_R$. The signals $Y_{R1}$ and $Y_{R2}$ and $Z_{R1}$ and $Z_{R2}$ are similarly combined by summers 358 and 360, respectively to produce rate signals $Y_R$ and $Z_R$.

The acceleration signals $X_A$, $Y_A$ and $Z_A$ are input to switches 364–366, respectively. The switches 364–366 are connected to sample and hold circuits 370–372 respectively. The outputs of the sample and hold circuits 370–372 are input to a multiplexer 374, which provides an output signal to an analog to digital circuit 378. Address bus 382 delivers the appropriate control signal to the multiplexer 374 to sequentially select the channel to be converted. The analog to digital circuit 378 provides a digital signal output to a digital controller and signal processor 384.

The rotation rate signals $X_R$, $Y_R$ and $Z_R$ are input to switches 390-392, respectively. The switches 390–392 are connected to sample and hold circuits 394–396 respectively. The outputs of the sample and hold circuits 394–396 are input to a multiplexer 400, which provides an output signal to an analog to digital circuit 402. Address bus 408 delivers the appropriate control signal to the multiplexer 400 to sequentially select the channels to be converted. The analog-to-digital circuit 402 provides a digital signal output to the digital controller and signal processor 384, which processes and outputs data for use in the system.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An acceleration sensing system, comprising:

a dither assembly;

a plurality of accelerometers mounted to the dither assembly for producing signals that indicate acceleration for three mutually perpendicular axes;

apparatus for applying a dither drive signal to the dither assembly such that the accelerometers are dithered at a frequency $\omega_D$ and produce electrical accelerometer output signals that are modulated at the frequency $\omega_D$;

apparatus for producing a first reference signal that is in phase with the dither drive signal and a second reference signal that is in quadrature with the dither drive signal;

an accelerometer signal pickoff arranged to provide the accelerometer output signals;

a multiplexer connected to the accelerometer signal pickoff;

sensor signal processing apparatus connected to the multiplexer for sequentially processing sensor output signals for each of the three axes, the sensor signal processing apparatus including:

a first rebalance path that includes:

an in-phase demodulator arranged for demodulating the sensor output signal with the first reference signal;

a first servo compensator connected for processing signals output from the in-phase demodulator to provide a rate signal; and an in-phase remodulator connected to the first servo compensator to remodulate the rate signal with the first reference signal;

a second rebalance path that includes:

a quadrature-phase demodulator arranged for demodulating the sensor output signal with the second reference signal;

a second servo compensator connected for processing signals output from the in-phase demodulator to provide a signal indicative of the Coriolis acceleration of the sensor; and a quadrature-phase remodulator connected to the second servo compensator to remodulate the rate signal with the second reference signal;

an acceleration channel that includes an acceleration channel servo compensator arranged to produce an acceleration feedback signal that is indicative of the linear acceleration input to the sensor along selected input axes; and an arithmetic logic unit connected to receive signals output from the first and second rebalance paths and the acceleration channel and produce an acceleration feedback signal; and apparatus for applying the acceleration feedback signal to the accelerometers to suppress motion of the accelerometers from Coriolis acceleration.

2. The apparatus of claim 1 wherein the apparatus for applying the dither drive signal to the dither assembly comprises:

a processing unit that includes a look-up table for providing the first and second reference signals as being proportional to $\cos(\omega_D t)$ and $\sin(\omega_D t)$, respectively;

a cosine modulator arranged to receive the first reference signal;

a sine modulator arranged to receive the second reference signal;

a summer arranged to receive signals output from the cosine and sine modulators and produce a summer output having a specified amplitude and phase; and apparatus for applying the summer output to the accelerometers to dither the accelerometers.

3. The apparatus of claim 2, further including apparatus for adjusting the dither angular velocity to be in-phase with the cosine waveform output of the look-up table.

* * * * *